(12) United States Patent
Sasaoka et al.

(10) Patent No.: US 8,024,749 B2
(45) Date of Patent: Sep. 20, 2011

(54) OPTICAL PICKUP AND OPTICAL DISC APPARATUS WITH IMPROVED SLIDE BASE

(75) Inventors: Hiromasa Sasaoka, Osaka (JP); Fumiaki Mori, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 341 days.

(21) Appl. No.: 12/424,855

(22) Filed: Apr. 16, 2009

(65) Prior Publication Data

US 2009/0274030 A1    Nov. 5, 2009

(30) Foreign Application Priority Data

May 1, 2008   (JP) ................... 2008-119649

(51) Int. Cl.
*G11B 7/08* (2006.01)
(52) U.S. Cl. .......................... 720/675; 720/663
(58) Field of Classification Search .......... 720/672–677, 720/663–665
See application file for complete search history.

(56) References Cited

U.S. PATENT DOCUMENTS

| | | | | |
|---|---|---|---|---|
| 5,764,618 A * | 6/1998 | Kim | .............................. | 720/675 |
| 6,058,098 A | 5/2000 | Kato | .............................. | 369/219 |
| 6,414,934 B1 * | 7/2002 | Akiba | ............................ | 720/675 |
| 6,724,714 B1 * | 4/2004 | Kato et al. | ................... | 720/672 |
| 6,922,840 B2 * | 7/2005 | Fujibayashi et al. | ........... | 720/675 |
| 6,948,178 B2 * | 9/2005 | Inatani et al. | ................ | 720/675 |
| 7,451,465 B2 * | 11/2008 | Hayashi et al. | ............... | 720/675 |
| 7,472,406 B2 * | 12/2008 | Nasu | .............................. | 720/679 |
| 2003/0235139 A1 | 12/2003 | Takeuchi | ...................... | 369/223 |
| 2006/0174254 A1 | 8/2006 | Takasawa et al. | ............. | 720/676 |

FOREIGN PATENT DOCUMENTS

| | | |
|---|---|---|
| JP | 2002-312956 | 10/2002 |
| JP | 2005-259254 | 9/2005 |
| JP | 2007-280463 A | 10/2007 |

* cited by examiner

*Primary Examiner* — Brian Miller
(74) *Attorney, Agent, or Firm* — Morgan, Lewis & Bockius LLP (57) ABSTRACT

A base of an optical pickup includes a first bearing portion through which one of two guide shafts disposed in parallel to each other is inserted and a second bearing portion through which the other guide shaft is inserted, and is slidable along the two guide shafts. Under the first guide shaft that is inserted through the first bearing portion, a nut hold portion for holding a nut that connects a member of a drive mechanism for driving the base and the base to each other is disposed on the base. The nut hold portion includes an insertion opening that allows the nut to be inserted along a direction substantially parallel to a longitudinal direction of the first guide shaft.

11 Claims, 5 Drawing Sheets

OPTICAL PICKUP AND OPTICAL DISC APPARATUS WITH IMPROVED SLIDE BASE

This application is based on Japanese Patent Application No. 2008-119649 filed on May 1, 2008, the contents of which are hereby incorporated by reference.

BACKGROUND OF THE INVENTION

1. Field of the Invention

The present invention relates to an optical pickup that is used to perform reading of information recorded on an optical disc and writing of information to an optical disc, and also relates to an optical disc apparatus that includes an optical pickup and performs reproducing of information recorded on an optical disc and recording of information to an optical disc.

2. Description of Related Art

Optical discs such as compact discs (hereinafter, called CDs), digital versatile discs (hereinafter, called DVDs), etc. have been widely used. Further, recently, optical discs such as Blu-ray discs (hereinafter, called BDs) and the like that can record large-size information have also been put to practical use. To carry out reproducing and recording of information from and to such an optical disc, an optical disc apparatus having an optical pickup is used.

Figure 7:
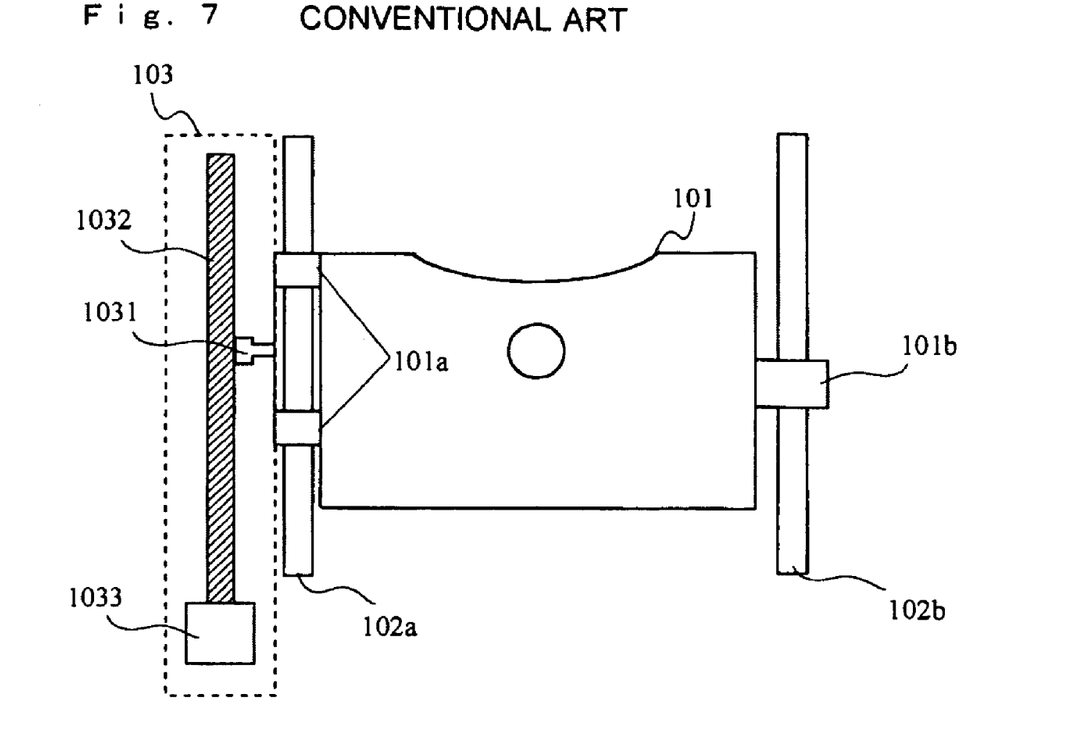
FIG. 7 is a schematic plan view showing an optical pickup and related portions used in a conventional optical disc apparatus.
Figure 8:
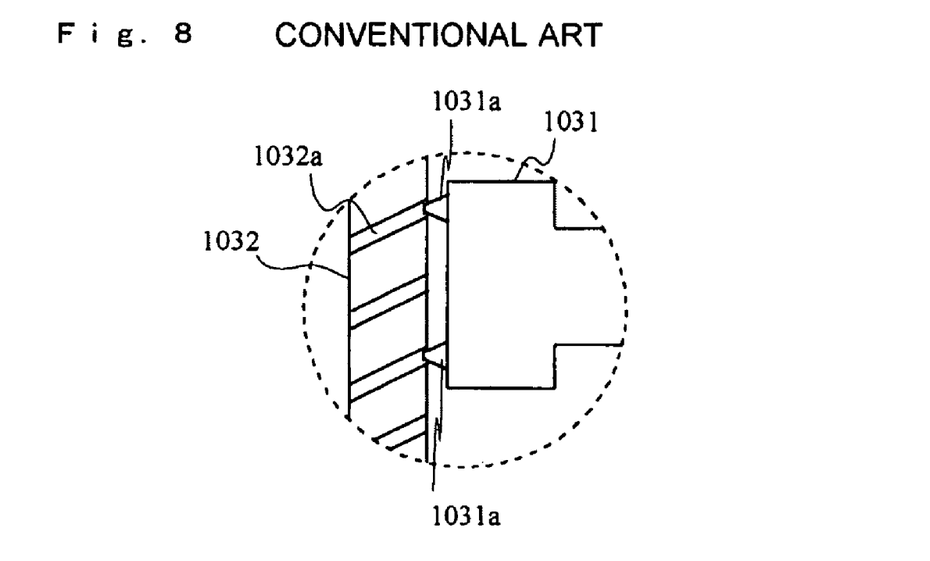
FIG. 8 is a view to explain relationship between a teeth member and a lead screw used in a conventional optical pickup.

FIG. 7 is a schematic plan view showing an optical pickup and related portions in a conventional optical disc apparatus. FIG. 8 is a view to explain relation between a teeth member and a lead screw used in a conventional optical pickup.

As shown in FIG. 7, a conventional optical pickup 101 has a first bearing portion 101a including two parts formed a predetermined distance away from each other at one end, and a second bearing portion 101b formed at the other end that is opposite to the one end. A first guide shaft 102a as a main shaft is inserted through the first bearing portion 101a, and a second guide shaft 102b as a sub-shaft is inserted though the second bearing portion 101b. Thus, the optical pickup 101 is slidable along the guide shafts 102a and 102b.

The movement of the optical pickup 101 along the guide shafts 102a and 102b is carried out by an optical pickup drive mechanism 103. The optical pickup drive mechanism 103 has various structures, and for example, as disclosed in JP-A-2007-280463, the optical pickup drive mechanism includes a teeth member 1031, a lead screw 1032, and a screw motor 1033.

The teeth member 1031 is detachably mounted on the optical pickup 101 with a screw (not shown). As shown in FIG. 8, the teeth member 1031 is provided with a plurality of gear teeth 1031a. Besides, as shown in FIG. 8, the lead screw 1032 is provided with a spiral groove 1032a, which meshes with the gear teeth 1031a. Accordingly, if the screw 1032 is rotated by operation of the screw motor 1033, the optical pickup 101 moves along the guide shafts 102a and 102b.

The guide shafts 102a and 102b are disposed extending in a longitudinal direction that is parallel to a radial direction of an optical disc (which is disposed at a position over the paper surface of FIG. 7, not shown, though). Thus, the optical pickup 101 is moved by the optical pickup drive mechanism 103 along the guide shafts 102a and 102b, so that the optical pickup 101 is able to access each address formed on an optical disc that rotates at high speed.

In the optical pickup composed as described above, recently, a base (hereinafter, called a slide base) that constitutes the optical pickup 101 is formed of a resin for cost reduction. If the slide base is formed of a resin, a part where a screw or the like is mounted is required to be thick from the viewpoint of strength compared with a slide base formed of a metal. Accordingly, the slide base becomes thick, and the entire optical pickup apparatus tends to become thick.

Figure 9:
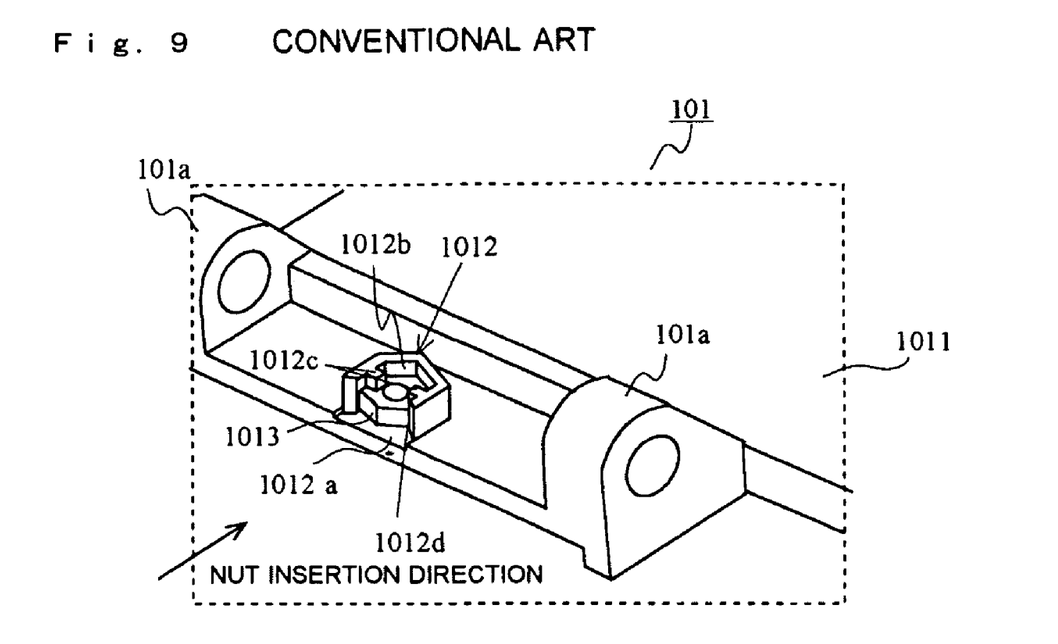
FIG. 9 is an enlarged perspective view of a first bearing portion and related portions of a conventional optical pickup.

Specifically, it is becoming unavoidable to form the slide base thick on the part thereof where the above teeth member 1031 is fixed with a screw to the slide base of the optical pickup 101. This is explained with reference to FIG. 9. FIG. 9 is an enlarged perspective view showing the first bearing portion 101a and related portions of the conventional optical pickup 101.

As shown in FIG. 9, in the conventional optical pickup 101, for easy mounting of the teeth member 1031, a nut hold portion 1012 is formed on the side of a slide base 1011 to position and hold a nut 1013. The nut hold portion 1012 includes a placement surface 1012a on which the nut 1013 is placed, a positioning wall 1012b that has a shape fitting the shape of the nut 1013 and positions the nut 1013 placed on the placement surface 1012a, two coming-out prevention portions 1012c that protrude from a position of the positioning wall 1012b higher than the thickness of the nut 1013 and prevent the nut 1013 from coming out, and an insertion opening 1012d that allows the nut 1013 to be inserted in a direction substantially perpendicular to the longitudinal direction of the first guide shaft 102a.

The nut hold portion 1012 is disposed under the guide shaft 102a, so that the nut hold portion 1012 does not obstruct the first guide shaft 102a when the first guide shaft 102a is inserted into the slide base 1011. If the coming-out prevention portion 1012c is formed thin, the coming-out prevention portion 1012c can be broken when the teeth member 1031 is fixed to the slide base 1011 with a screw. For this reason, the coming-out prevention portion 1012c needs to be formed thick to some extent. Accordingly, it is unavoidable to form the slide base 1011 thick to some extent because of the presence of the nut hold portion 1012.

However, a thin optical pickup apparatus is an important factor in raising the added value of the product, and the demand for a thin optical pickup apparatus is increasing in the market. Accordingly, in the conventional optical pickup, in forming the slide base 1011 of a resin, because the slide base 1011 cannot be formed so thick, the slide base 101 is sometimes broken when it is fixed with a screw. If the nut hold portion 1012 is structured complicatedly, it is possible to prevent the breakage at the time of fixing. However, such a complicated structure is a cause of cost increase such as increase in mold components at the time of fabrication and the like, which needs to be avoided.

SUMMARY OF THE INVENTION

In light of the above points, it is an object of the present invention to provide an optical pickup that secures strength with a simple structure and allows a base to be formed thin even if the base is formed of a resin. It is another object of the present invention to provide an optical disc apparatus at low cost that includes such an optical pickup and is thin.

To achieve the above object, an optical pickup according to the present invention comprises: a light source; an optical system that guides light emitted from the light source to an information recording surface of an optical disc and guides reflected light from the optical disc to a predetermined position; a light receiving device that is disposed at the predetermined position and receives the reflected light to perform photoelectric conversion; a base on which the light source, the optical system and the light receiving device are mounted, the base includes a first bearing portion through which one of two guide shafts disposed in parallel to each other is inserted and a second bearing portion through which the other guide shaft is inserted, and is slidable along the two guide shafts. Under the first guide shaft that is inserted through the first bearing portion, a nut hold portion for holding a nut that connects a member of a drive mechanism for driving the base and the base to each other is disposed on the base. The nut hold portion includes an insertion opening that allows the nut to be inserted along a direction substantially parallel to a longitudinal direction of the first guide shaft.

According to the structure, when inserting a nut into the nut hold portion, the nut is inserted along the direction substantially parallel to the longitudinal direction of the guide shaft. In this structure, it is possible to provide a base having a simple structure that is not easily broken at the time of being fixed with a screw without forming the entire nut hold portion thick. In other words, it is possible to provide an optical pickup that secures strength with a simple structure and allows the base to be formed thin.

As a specific structure of the above optical pickup, a structure may be employed, in which the nut hold portion includes a placement surface on which the nut inserted through the insertion opening is placed, a positioning wall that has a shape fitting the shape of the nut and positions the nut placed on the placement surface, and two coming-out preventing portions that are disposed substantially opposite to each other on upper portions of the positioning walls. The coming-out prevention portions have a tilted surface that faces the first guide shaft and a lower portion that protrudes beyond the positioning wall.

According to this structure, the coming-out prevention portion that prevents the nut from coming out has the tilted surface facing the guide shaft and a lower portion that protrudes beyond the positioning wall. For this reason, because the coming-out prevention portion can be formed thick without hitting the guide shaft, it is possible to achieve a structure in which the nut hold portion is not easily broken at the time of being fixed with a screw. Accordingly, it is possible to increase the strength of the nut hold portion and form the optical pickup thin. Besides, according to the structure, it is possible to provide an optical pickup having a simple structure in which the base of the optical disc is not complicated compared with the conventional nut hold portion.

In the optical pickup having the above structure, it is preferable that the base is formed of a resin. According to this structure, it is possible to achieve low cost of the optical pickup and eliminate the conventional problem that a thin structure causes easy breakage of the optical pickup at the time of fabrication.

As a specific structure, the above optical pickup may have a structure, in which the first bearing portion includes two parts that are disposed in the longitudinal direction a predetermined distance away from each other, and the nut hold portion is disposed between the two parts that form the first bearing portion. According to this structure, the optical pickup is able to slide in a well-balanced manner and smoothly, and it is possible to achieve reduction in cost and thickness of the optical pickup.

In addition, to achieve the object, an optical disc apparatus according to the present invention is an optical disc apparatus that performs at least information reproduction, that is, one of reproducing information recorded on an optical disc and recording information to an optical disc. The optical disc apparatus includes an optical pickup having the above structure, the two guide shafts, and the drive mechanism that allows the optical pickup to be slidable along the two guide shafts.

According to the structure, the optical disc apparatus includes an optical pickup device that secures strength with a simple structure and allows the base to be formed thin. Accordingly, it is possible to provide an optical disc apparatus that is able to be formed thin at low cost.

According to the present invention, it is possible to provide an optical pickup that secures strength with a simple structure and allows the base to be formed thin even if the base is formed of a resin. Besides, according to the present invention, it is possible to provide an optical disc apparatus at low cost that includes the optical pickup and is formed thin.

DETAILED DESCRIPTION OF THE PREFERRED EMBODIMENTS

Hereinafter, embodiments of an optical pickup and an optical disc apparatus according to the present invention are explained with reference to drawings.

Figure 1:
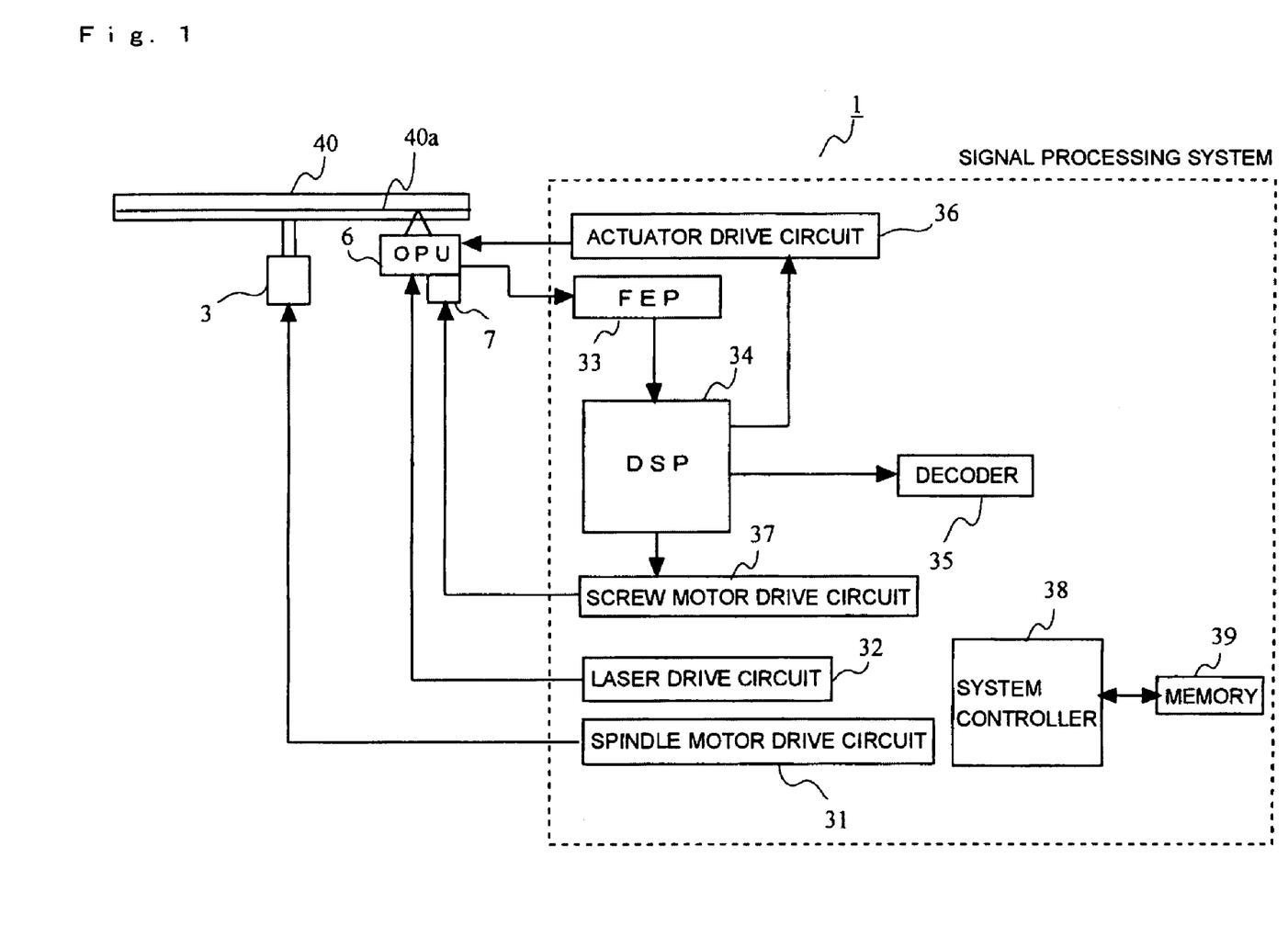
FIG. 1 is a block diagram showing a structure of an optical disc apparatus according to an embodiment.
Figure 2:
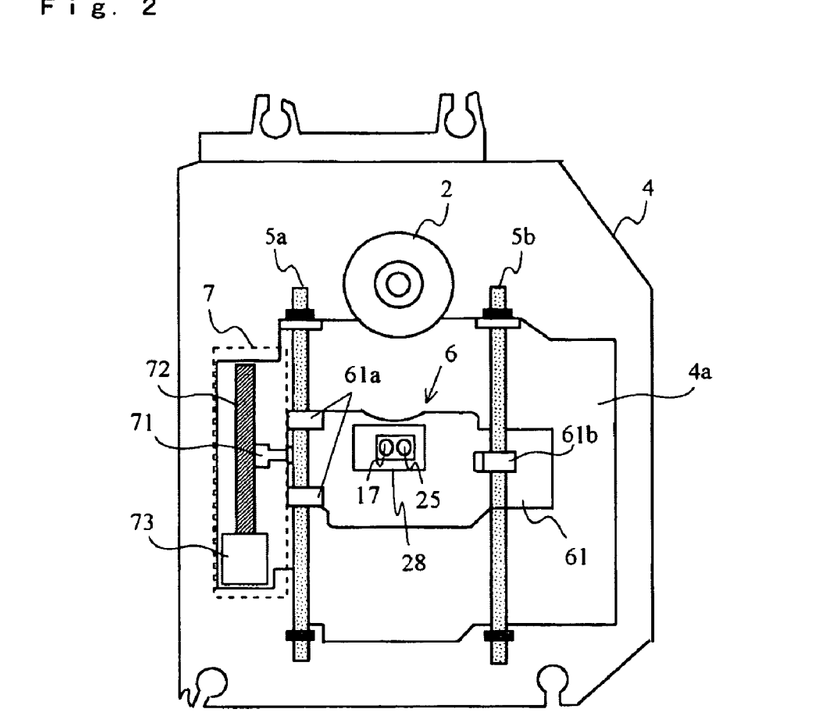
FIG. 2 is a schematic plan view showing an optical pickup of an optical disc apparatus and related components according to the embodiment.
Figure 3:
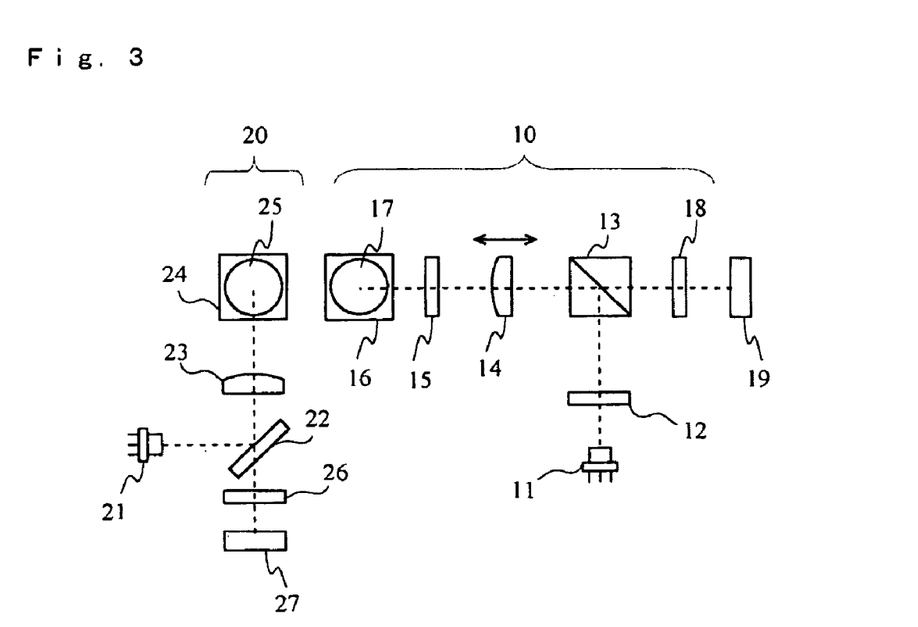
FIG. 3 is a schematic view showing a structure of an optical system of an optical pickup according to the embodiment.

FIG. 1 is a block diagram showing a structure of an optical pickup according to the embodiment. FIG. 2 is a schematic plan view showing a structure of an optical pickup and related portions of an optical disc apparatus according to the embodiment. FIG. 3 is a schematic view showing an optical system of an optical pickup according to the embodiment. Hereinafter, structures of an optical disc apparatus and an optical pickup according to the embodiment are described schematically with reference to FIGS. 1 to 3.

An optical disc apparatus 1 according to the embodiment is so structured as to carry out information reproduction from three kinds of optical discs, a BD, a DVD and a CD. An optical disc 40 is able to be moved in and out of the optical disc apparatus 1 with a tray, not shown, and the optical disc 40 inserted in the optical disc apparatus 1 is held by a turntable 2 (see FIG. 2). The turntable 2 is connected to a spindle motor 3 (see FIG. 1) and rotated by the spindle motor 3.

On a traverse chassis 4 (see FIG. 2) disposed under the tray (not shown) on which the optical disc 40 is placed, a first guide shaft 5*a* and a second guide shaft 5*b* are fixed and disposed in parallel to each other. The longitudinal directions of the two guide shafts 5*a*, 5*b* are parallel to a radial direction of the optical disc 40. An opening 4*a* is formed through a substantially central portion of the traverse chassis 4. And, the optical pickup 6 that is held slidably by the two guide shafts 5a and 5b is able to move in the radial direction of the optical disc 40.

As shown in FIG. 2, the optical pickup 6 comprises a slide base 61 that is provided with a first bearing portion 61a which includes two parts disposed at one end of the slide base 61a predetermined distance away from each other and a second bearing portion 61b disposed near the other end opposite to the one end. A first guide shaft 5a that serves as a main shaft is inserted through the first bearing portion 61a, and a second guide shaft 5b that serves as a sub-shaft is inserted through the second bearing portion 61b. Thus, the optical pickup 6 is slidable along the guide shafts 5a and 5b.

On the slide base 61 of the optical pickup 6, a light source, an optical system that guides light emitted from the light source to an information recording surface 40a of the optical disc 40 and guides reflected light from the optical disc 40 to a light receiving device, and the light receiving device are mounted, which is described in detail with reference to FIG. 3.

The optical pickup 6 comprises separately an optical system 10 used for a BD and an optical system 20 used for a DVD and a CD (sometimes referred to as DVD/CD). The optical system 10 used for a BD guides laser light emitted from a first semiconductor laser (light source) 11 to the information recording surface 40a of the optical disc 40 and guides reflected light from the optical disc 40 to a first photo detector (light receiving device) 19. On the other hand, the optical system 20 used for DVD/CD guides laser light emitted from a second semiconductor laser (light source) 21 to the information recording surface 40a of the optical disc 40 and guides reflected light from the optical disc 40 to a second photo detector (light receiving device) 27.

The first semiconductor laser 11 emits light having a wavelength of, for example, 405 nm. The second semiconductor laser 21 emits laser light having a wavelength of, for example, 650 nm and laser light having a wavelength of, for example, 780 nm switching them. As the two-wavelength laser, what is called a monolithic semiconductor laser or a hybrid semiconductor laser is preferably used. The first photo detector 19 and the second photo detector 27 transduce a received light signal into an electrical signal and output it. The output signal is processed into a reproduction RF signal, a focus error (FE) signal, a tracking error (TE) signal or another signal.

The optical system 10 for a BD comprises a diffraction element 12, a polarization beam splitter 13, a collimate lens 14, a ¼ (quarter) wave plate 15, a first raising mirror 16, a first objective lend (objective) 17, and a first cylindrical lens 18.

Laser light (linearly polarized light) emitted from the first semiconductor laser 11 is divided by the diffraction element 12 into two beams of a principal beam and a sub-beam. Then, the light is reflected by the polarization beam splitter 13 and passes through the first collimate lens 14. The first collimate lens 14 is disposed slidably in an optical-axis direction (a direction indicated by an arrow in FIG. 3) to be able to correct spherical aberration. Convergent and divergent states of light entering the first objective 17 are able to be changed by adjusting the position of the first collimate lens 14.

The laser light having passed through the first collimate lens 14 is transformed by the ¼ wave plate 15 into circularly polarized light, reflected by the first raising mirror 16, and the traveling direction is changed to a direction (a direction from the paper surface toward a point over the paper surface of FIG. 3) to the optical disc. The light reflected by the first raising mirror 16 is condensed by the first objective 17 on the information recording surface 40a (see FIG. 1) of the optical disc.

Then, the reflected light reflected by the information recording surface 40a passes through the first objective 17 and is reflected by the first raising mirror 16, and transformed by the ¼ wave plate 15 into linearly polarized light. Here, the polarization direction is a direction that is rotated by 90° to the polarization direction of the linearly polarized light emitted from the first semiconductor laser 11.

The reflected light having passed through the ¼ wave plate 15 passes through the first collimate lens 14 and the polarization beam splitter 13, undergoes astigmatism by the first cylindrical lens 18 and is received by the first photo detector 19.

The optical system 20 for DVD/CD comprises a half mirror 22, a second collimate lens 23, a second raising mirror 24, a second objective 25, and a second cylindrical lens 26.

Laser light (linearly polarized light) emitted from the second semiconductor laser 21 is reflected by the half mirror 22, and transformed by the second collimate lens 23 into parallel light. The parallel light transformed by the second collimate lens 23 is reflected by the second raising mirror 24, and its traveling direction is changed to a direction (in FIG. 3, a direction from the paper surface toward a point over the paper surface) to the optical disc. The light reflected by the second raising mirror 24 is condensed by the second objective 25 on the information recording surface 40a (see FIG. 1) of the optical disc.

Then, the reflected light reflected by the information recording surface 40a passes through the second objective 25, is reflected by the second raising mirror 24, passes through the second collimate lens 23 and the half mirror 22, undergoes astigmatism by the second cylindrical lens 26, and received by the second photo detector 27.

As shown in FIG. 2, the first objective 17 and the second objective 25 are mounted on the slide base 61 with held on an objective actuator 28 that is disposed on the slide base 61. Thus, the first and second objectives 17 and 25 are held on the objective actuator 28, so that the first and second objectives 17 and 25 are disposed movably in a focus direction perpendicular to the information recording surface 40a of the optical disc 40 and in a track direction parallel to the radial direction of the optical disc 40. Accordingly, focusing control and tracking control of the optical pickup 6 are possible.

The optical pickup 6 having the structure described above is moved by the optical pickup drive mechanism 7 (see FIGS. 1 and 2) along the guide shafts 5a and 5b. Thus, the optical pickup 1 is able to access each address formed on the optical disc 40 that rotates at high speed, and it is possible to carry out reproduction of information recorded on the optical disc 40. The optical pickup drive mechanism 7 is so structured as to include a teeth member 71, a lead screw 72, and a screw motor 73, which is the same structure as that of the conventional optical pick up 101 and detailed description of the structure is skipped.

The teeth member 71 is detachably mounted on the slide base 61 of the optical pickup 6, and the screw motor 73 to which the lead screw 72 is connected is mounted on the traverse chassis 4 with a member not shown.

Referring to FIG. 1, operation of the above spindle motor 3 is controlled by a spindle motor drive circuit 31. Control of laser power of the first and second semiconductor lasers 11 and 21 of the optical pickup 6 is carried out by a laser drive circuit 32. Electrical signals outputted from the first and second photo detectors 19 and 27 are transmitted to an FEP (Front End Processor) 33, where various operations, gain adjustment, noise removal and other operations are performed. Specifically, a reproduction RF signal, an FE signal, a TE signal and other signals are generated with signal processing by the FEP 33.

In synchronization with a clock generated by a synchronizing-signal generation circuit (not shown) that has a circuit configuration called PLL (Phase Locked Loop), a DSP (Digital Signal Processor) 34 applies AD conversion (analog-digital conversion) to a reproduction RF signal supplied from the FEP circuit 33. The reproduction RF signal that has undergone the AD conversion is transmitted to a decoder 35. The decoder 35 demodulates data, checks for an error in the data and corrects an error if the error is correctable. The reproduction data obtained by the decoder 35 is outputted to the outside via an interface not shown.

The DSP 34 includes a servo controller circuit as well. Under control by a system controller 38, the DSP 34 controls operation of the objective actuator 28 through an actuator drive circuit 36 using an FE signal and a TE signal outputted from the FEP 33, thereby performing focusing control and tracking control. Besides, through a screw-motor drive circuit 37, the DSP 34 controls the screw motor 73 of the optical pickup drive mechanism 7 that allows a radial-direction movement of the optical pickup 6.

The system controller 38 includes a microcomputer, is connected to each portion constituting the optical disc apparatus 1 through signal lines not shown, and controls suitably each portion according to necessary operation that is carried out by each portion. A memory (storage portion) 39 is connected to the system controller 38. Various parameters, operation programs and other data that are necessary for manipulations which the system controller 38 implements are stored in the memory 39.

Figure 4:
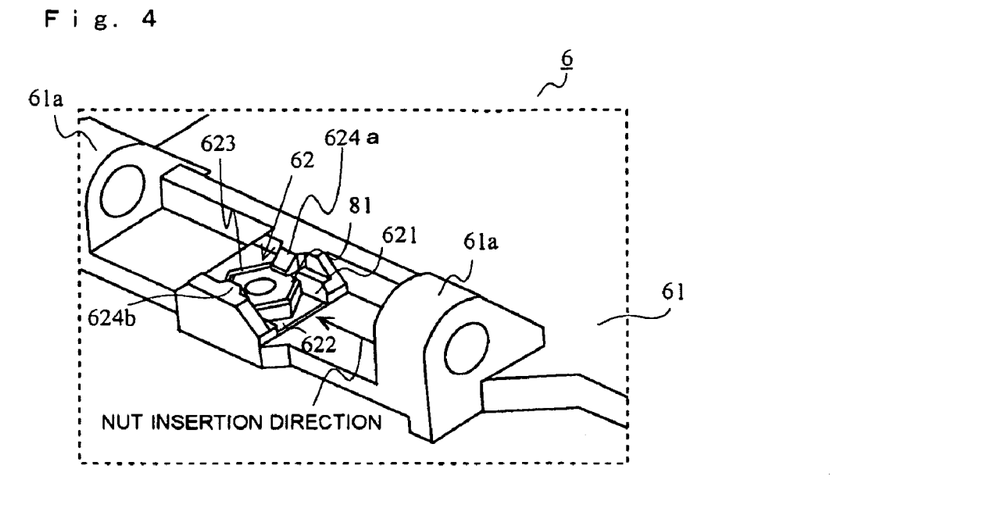
FIG. 4 is an enlarged schematic perspective view showing a first bearing portion and related portions of an optical pickup according to the embodiment.
Figure 5:
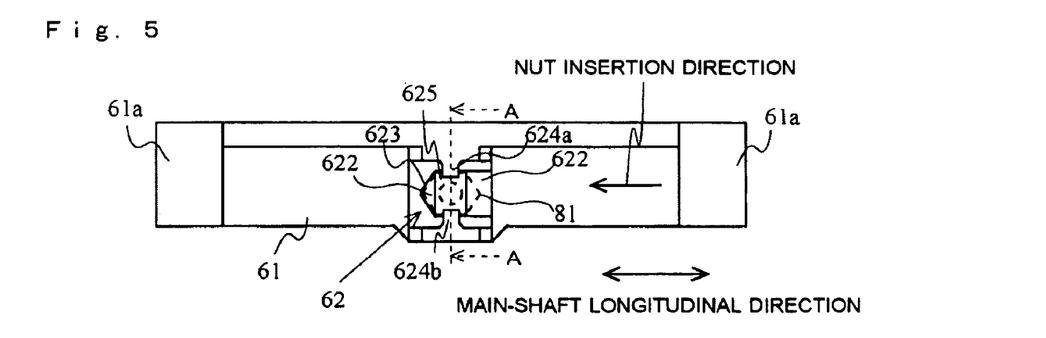
FIG. 5 is a schematic plan view showing a first bearing portion and related portions of an optical pickup according to the embodiment seen from over.
Figure 6:
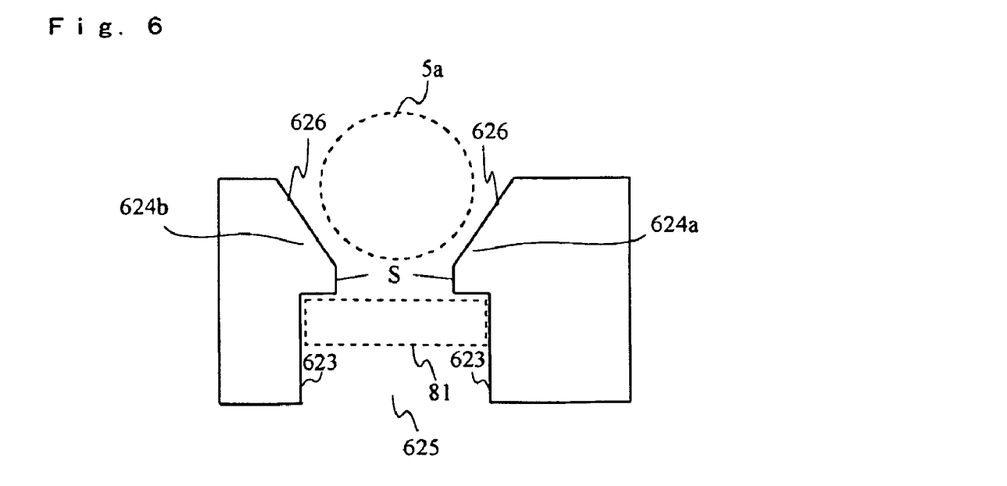
FIG. 6 is a schematic sectional view taken along an A-A line in FIG. 5.

An overview of the structures of the optical disc apparatus 1 and the optical pickup 6 according to the embodiment is described above. Next, referring to FIGS. 4 to 6, the optical pickup 6 according to the embodiment is described in more detail. FIG. 4 is an enlarged schematic perspective view showing the first bearing portion 61*a* and related portions of the optical pickup 6 according to the embodiment. FIG. 5 is a schematic plan view showing the first bearing portion 61*a* and related portions of the optical pickup 6 according to the embodiment seen from over. FIG. 6 is a schematic sectional view taken along an A-A line in FIG. 5.

As described above, the teeth member 71 that constitutes the optical pickup drive mechanism 7 is mounted on the slide base 61 of the optical pickup 6 with a screw (see FIG. 2). For this purpose, the slide base 61 is provided with a nut hold portion 62 that holds a nut 81 which is used at the time of fixing with a screw for easy mounting of the teeth member 71. The teeth member 71 is mounted on the lower surface of the slide base 61, and the nut hold portion 62 is formed on the upper surface (the surface facing the first guide shaft 5*a* that is inserted through the first bearing portion 61*a*) of the slide base 61.

The nut 81 is disposed under the first guide shaft 5*a*, so that the nut 81 does not obstruct the first guide shaft 5*a* that is inserted through the first bearing portion 61*a*. In the embodiment, because the teeth member 71 is mounted on a substantially central position between the two parts that constitute the first bearing portion 61*a*, the nut hold portion 62 also is mounted on a position close to the mount position of the teeth member 71. However, the forming position of the nut hold portion 62 may be changed suitably for the mount position of the teeth member 71.

The nut hold portion 62 includes an insertion opening 621 through which the nut 81 is inserted when holding the nut 81, a placement surface 622 on which the nut 81 inserted through the insertion opening 621 is placed, a positioning wall 623 that positions the nut 81 placed on the placement surface 622, and two coming-out prevention portions 624*a* and 624*b* that prevent the nut 81 positioned and placed on the placement surface 622 from coming out of the nut hold portion 62 at the time of fixing with a screw.

As shown in FIG. 4 or 5, the nut hold portion 62 is provided with the insertion opening 621 that allows the nut 81 to be inserted along a direction substantially parallel to the longitudinal direction of the first guide shaft 5*a* that is inserted through the first bearing portion 61*a*. Specifically, in the embodiment, referring to FIG. 5, the nut insertion opening 621 is so formed as to allow the nut 81 to be inserted into the nut hold portion 62 in a direction from right to left in FIG. 5.

Besides, a through hole 625 having a substantially rectangular shape in plan view is formed through a substantially central portion of the placement surface 622 on which the nut 81 is placed. This through hole 625 is formed to allow a screw shaft to be inserted when mounting the teeth member 71 on the slide base 61 with a screw. Besides, the through hole 625 is formed to allow the thick coming-out prevention portion 624 to be made without increasing the number of mold components when forming the slide base 61 of a resin such as PPS (polyphenylene sulphide) and the like.

As shown in FIG. 4 or 5, the positioning wall 623 has a shape that fits the shape of the nut 81 placed on the placement surface 622. Specifically, the positioning wall 623 includes four wall surfaces that come into contact with four surfaces of the hexagonal-shape nut 81 which is inserted through the insertion opening 621, and the space enclosed partially by the four surfaces is a substantially pentagonal shape in plan view.

The two coming-out prevention portions 624*a* and 624*b* are disposed on upper portions of the positioning walls 623 with substantially opposite to each other. As shown in FIG. 6, the two coming-out prevention portions 624*a* and 624*b* each have a tilted surface 626 that faces the first guide shaft 5*a* which is inserted through the first bearing portion 61*a*. And the two coming-out prevention portions 624*a* and 624*b* each are so formed that lower portions thereof protrude beyond the positioning walls 623. According to this structure, it is possible to prevent the nut 81 from coming out even if, for example, the slide base 61 is placed upside down when mounting the teeth member 71 on the slide base 61.

It is preferable that the coming-out prevention portions 624*a* and 624*b* each are so formed as to have a surface S (see FIG. 6) at their lower portions that is substantially parallel to the longitudinal direction of the first guide shaft 5*a* as in the embodiment. According to this structure, it is possible to reduce breakage in the nut hold portion 62 that occurs at the time of fixing with a screw and the like.

The two coming-out prevention portions 624*a* and 624*b* each are so formed as to have a portion that protrudes beyond the positioning wall 623. In such structure, if a through hole is formed through a lower part of the protruding portion, it is possible to form the protruding portions 624*a* and 624*b* by pulling out molds upward and downward. The through hole 625 is formed for this purpose as well.

According to the structure in the embodiment, the two coming-out prevention portions 624*a* and 624*b* are so structured as to be thick in the upward direction (the side above which the first guide shaft 5*a* is present) using the tilted surfaces 626 and not to obstruct the first guide shaft 5*a*. Thus, the structure is obtained, in which the nut portion 62 is not easily broken without forming the portion under the first guide shaft 5*a* thick. Besides, the structure is formed simple without increasing the number of mold components, which curbs increase in unnecessary cost. In addition, almost likewise as in the conventional structure, the teeth member 71 is mounted on the slide base 61, fabrication efficiency is not lowered.

The embodiments described above are examples, and the present invention is not limited to the embodiments described above. Various modifications can be made to the embodiments described above without departing from the objects of the present invention.

For example, in the embodiments, the structure is employed, in which the optical pickup drive mechanism 7 that drives the optical pickup 6 is operated by using interaction between the teeth member 71 and the lead screw 72. However, for example, there is a case in which the optical pickup 6 is operated by using interaction between a rack and a pinion. In such a case, likewise as in the embodiments, if the rack is mounted on a slide base of an optical pickup, the present invention is applicable to such an optical pickup.

In the embodiments, the optical disc apparatus having the optical pickup according to the present invention is dedicated to reproduction. However, it is needless to say that the present invention is applicable to an optical disc apparatus that is able to perform not only reproduction but also recording. In the embodiments, it is described that the optical pickup is used for a BD, a DVD and a CD. However, of course, the present invention is applicable to an optical pickup that is compatible with one kind of optical disc, and to an optical pickup that is compatible with a plurality of kinds of optical discs but different from the optical pickup in the embodiment.

The optical pickup according to the present invention achieves low cost by forming the base of a resin and further allows reduction in thickness. Accordingly, the present invention is useful as an invention of an optical pickup and preferably applicable to an optical disc apparatus.

What is claimed is:

1. An optical pickup, comprising:
   a light source;
   an optical system that guides light emitted from the light source to an information recording surface of an optical disc and guides reflected light from the optical disc to a predetermined position;
   a light receiving device that is disposed at the predetermined position and receives the reflected light to perform photoelectric conversion;
   a base on which the light source, the optical system and the light receiving device are mounted, the base includes a first bearing portion through which one of two guide shafts disposed in parallel to each other is inserted and a second bearing portion through which the other guide shaft is inserted, and is slidable along the two guide shafts,
   wherein under the first guide shaft that is inserted through the first bearing portion, a nut hold portion for holding a nut that connects a member of a drive mechanism for driving the base and the base to each other is disposed on the base,
   and the nut hold portion includes an insertion opening that allows the nut to be inserted along a direction substantially parallel to a longitudinal direction of the first guide shaft.

2. The optical pickup according to claim 1, wherein the nut hold portion further includes:
   a placement surface on which the nut inserted through the insertion opening is placed;
   a positioning wall that has a shape fitting the shape of the nut and positions the nut placed on the placement surface; and
   two coming-out preventing portions that are disposed substantially opposite to each other on an upper portion of the positioning wall,
   wherein the coming-out prevention portions have a tilted surface that faces the first guide shaft and a lower portion that protrudes beyond the positioning wall.

3. The optical pickup according to claim 2, wherein the base is made of a resin.

4. The optical pickup according to claim 3, wherein
   the first bearing portion includes two parts that are disposed in the longitudinal direction a predetermined distance away from each other, and
   the nut hold portion is disposed between the two parts that form the first bearing portion.

5. The optical pickup according to claim 2, wherein
   the first bearing portion includes two parts that are disposed in the longitudinal direction a predetermined distance away from each other, and
   the nut hold portion is disposed between the two parts that form the first bearing portion.

6. The optical pickup according to claim 1, wherein the base is made of a resin.

7. The optical pickup according to claim 6, wherein
   the first bearing portion includes two parts that are disposed in the longitudinal direction a predetermined distance away from each other, and
   the nut hold portion is disposed between the two parts that form the first bearing portion.

8. The optical pickup according to claim 1, wherein
   the first bearing portion includes two parts that are disposed in the longitudinal direction a predetermined distance away from each other, and
   the nut hold portion is disposed between the two parts that form the first bearing portion.

9. An optical disc apparatus, comprising:
   an optical pickup, further comprising:
      a light source;
      an optical system that guides light emitted from the light source to an information recording surface of an optical disc and guides reflected light from the optical disc to a predetermined position;
      a light receiving device that is disposed at the predetermined position and receives the reflected light to perform photoelectric conversion;
      a base on which the light source, the optical system and the light receiving device are mounted, the base includes a first bearing portion through which one of two guide shafts disposed in parallel to each other is inserted and a second bearing portion through which the other guide shaft is inserted, and is slidable along the two guide shafts,
      wherein under the first guide shaft that is inserted through the first bearing portion, a nut hold portion for holding a nut that connects a member of a drive mechanism for driving the base and the base to each other is disposed on the base,
      and the nut hold portion includes an insertion opening that allows the nut to be inserted along a direction substantially parallel to a longitudinal direction of the first guide shaft;
   and
   the drive mechanism that allows the optical pickup to be slidable along the two guide shafts.

10. An optical disc apparatus, comprising:
    an optical pickup, further comprising:
       a light source;

an optical system that guides light emitted from the light source to an information recording surface of an optical disc and guides reflected light from the optical disc to a predetermined position;

a light receiving device that is disposed at the predetermined position and receives the reflected light to perform photoelectric conversion;

a base on which the light source, the optical system and the light receiving device are mounted, the base includes a first bearing portion through which one of two guide shafts disposed in parallel to each other is inserted and a second bearing portion through which the other guide shaft is inserted, and is slidable along the two guide shafts, wherein under the first guide shaft that is inserted through the first bearing portion, a nut hold portion for holding a nut that connects a member of a drive mechanism for driving the base and the base to each other is disposed on the base, and the nut hold portion includes an insertion opening that allows the nut to be inserted along a direction substantially parallel to a longitudinal direction of the first guide shaft;

wherein the nut hold portion further includes:
   a placement surface on which the nut inserted through the insertion opening is placed;
   a positioning wall that has a shape fitting the shape of the nut and positions the nut placed on the placement surface; and
   two coming-out preventing portions that are disposed substantially opposite to each other on an upper portion of the positioning wall,
   wherein the coming-out prevention portions have a tilted surface that faces the first guide shaft and a lower portion that protrudes beyond the positioning wall; and the drive mechanism that allows the optical pickup to be slidable along the two guide shafts.

11. An optical disc apparatus, comprising:
an optical pickup, further comprising:
   a light source;
   an optical system that guides light emitted from the light source to an information recording surface of an optical disc and guides reflected light from the optical disc to a predetermined position;
   a light receiving device that is disposed at the predetermined position and receives the reflected light to perform photoelectric conversion;
   a base on which the light source, the optical system and the light receiving device are mounted, the base includes a first bearing portion through which one of two guide shafts disposed in parallel to each other is inserted and a second bearing portion through which the other guide shaft is inserted, and is slidable along the two guide shafts,
   wherein under the first guide shaft that is inserted through the first bearing portion, a nut hold portion for holding a nut that connects a member of a drive mechanism for driving the base and the base to each other is disposed on the base,
   and the nut hold portion includes an insertion opening that allows the nut to be inserted along a direction substantially parallel to a longitudinal direction of the first guide shaft;
   wherein the nut hold portion further includes:
     a placement surface on which the nut inserted through the insertion opening is placed;
     a positioning wall that has a shape fitting the shape of the nut and positions the nut placed on the placement surface; and
     two coming-out preventing portions that are disposed substantially opposite to each other on an upper portion of the positioning wall,
     wherein the coming-out prevention portions have a tilted surface that faces the first guide shaft and a lower portion that protrudes beyond the positioning wall;
   wherein the base is made of a resin; and
the drive mechanism that allows the optical pickup to be slidable along the two guide shafts.

* * * * *